United States Patent
Holla P K et al.

(10) Patent No.: US 9,059,992 B2
(45) Date of Patent: Jun. 16, 2015

(54) DISTRIBUTED MOBILE ENTERPRISE APPLICATION PLATFORM

(71) Applicants: Ullas Holla P K, Bangalore (IN);
Ashwani Kumar, Bangalore (IN);
Pradeep Kumar Warrier, Bangalore (IN)

(72) Inventors: Ullas Holla P K, Bangalore (IN);
Ashwani Kumar, Bangalore (IN);
Pradeep Kumar Warrier, Bangalore (IN)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 13/717,647

(22) Filed: Dec. 17, 2012

(65) Prior Publication Data
US 2014/0172955 A1    Jun. 19, 2014

(51) Int. Cl.
| | | |
|---|---|---|
| H04L 29/08 | (2006.01) | |
| G06F 9/445 | (2006.01) | |
| G06F 9/50 | (2006.01) | |

(52) U.S. Cl.
CPC ............... *H04L 67/10* (2013.01); *H04L 67/34* (2013.01); *G06F 8/60* (2013.01); *G06F 9/50* (2013.01)

(58) Field of Classification Search
CPC ............ H04L 67/1002; H04L 67/1036; H04L 67/1027; H04L 67/1034; H04L 67/1038
USPC .................. 709/203, 217, 218, 219, 226, 229
See application file for complete search history.

(56) References Cited

U.S. PATENT DOCUMENTS

| | | | | |
|---|---|---|---|---|
| 2009/0307706 | A1* | 12/2009 | Jostmeyer et al. | 718/104 |
| 2010/0299451 | A1* | 11/2010 | Yigang et al. | 709/241 |
| 2011/0078318 | A1* | 3/2011 | Desai et al. | 709/228 |
| 2012/0149996 | A1* | 6/2012 | Stivoric et al. | 600/301 |
| 2012/0158824 | A1* | 6/2012 | Park | 709/203 |

* cited by examiner

*Primary Examiner* — Liangche A Wang

(57) ABSTRACT

Various embodiments of systems and methods for distributed mobile enterprise application platform (MEAP) are described herein. In one aspect, the method includes receiving a request to be executed from a mobile device. Based upon the request, one or more middleware components capable of executing the request are determined from one or more remotely located servers. A middleware component from the one or more middleware components is selected for executing the request. The request is sent to the selected middleware component for execution. Based upon the execution, an output is received from the selected middleware component. In one embodiment, the output is stored in a backend system or sent to a portable device from which the request is received. In another embodiment, the output is sent to another middleware component for further execution.

17 Claims, 8 Drawing Sheets

DISTRIBUTED MOBILE ENTERPRISE APPLICATION PLATFORM

BACKGROUND

A mobile enterprise application platform (MEAP) provides a middleware for linking enterprise applications or databases to mobile applications. A MEAP supports a limited number of mobile devices without degrading performance. For supporting more mobile devices new MEAPs are required to be installed. Installing a new MEAP requires effort and time because components of existing MEAP are required to be copied to the new MEAP. Additionally, if the performance of the MEAP degrades, the MEAP needs to be scaled-up, e.g., by adding or upgrading physical resources such as a memory, CPU, etc. However, the addition or upgradation of physical resources requires shut down of the MEAP. Therefore, there is potential loss of operational or productive time. Further, the MEAP may also need to be shut down for software upgrades, which again leads to potential loss of operational or productive time.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for distributed mobile enterprise application platform (MEAP) are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Distributed mobile enterprise application platform (MEAP) is a middleware which links enterprise applications or databases to mobile applications. Components of the distributed MEAP middleware are used for executing requests from various mobile devices. A middleware component may be a software application capable of performing a task including at least one of processing data, storing data, forwarding data, assigning data, and sending confirmation. In one embodiment, a middleware component, can be a sender which sends data or a message to other component. In one embodiment, the middleware component can be a target which receives data or messages. In one instance the middleware component can act like the sender and at other instance the same middleware component can act like the target. In one embodiment, the middleware component may be a 'state machine' component. In the below description, the middleware component may be simply referred as a component.

Target is the middleware component which processes or executes data passed to it. In one embodiment, executing data implies transforming data. In another embodiment, executing data implies forwarding data to some other middleware component. In one embodiment, the target can be a software application or an enterprise system.

Sender is the middleware component which sends data to be executed by some other middleware component. The sender delegates or assigns data to some other middleware components. For example, a load balancer or a process delegator may be the sender which sends data to the target for executing.

Figure 1:
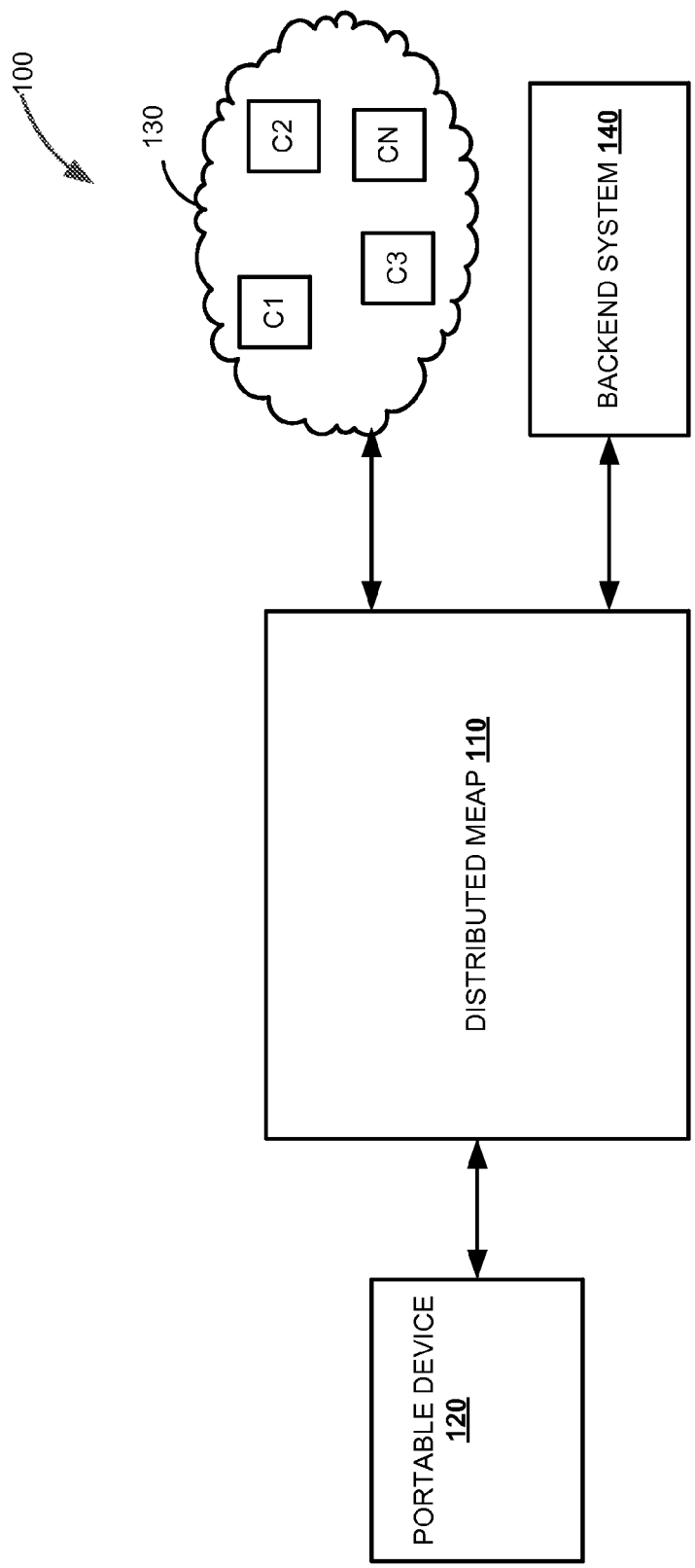
FIG. 1 is a block diagram of a system including a distributed mobile enterprise application platform (MEAP) for processing requests from a portable device, according to an embodiment.

FIG. 1 illustrates one embodiment of a system 100 including a distributed mobile enterprise application platform (MEAP) 110 for executing a request received from a portable device 120. The portable device 120 is registered with the distributed MEAP 110. The distributed MEAP 110 identifies the request and selects a middleware component for executing the request. For example, the distributed MEAP 110 may select a middleware component C1 to execute the request. The middleware component may be simply referred as a component. The component C1 may be selected from various components C1-CN. The components C1-CN may be available on one or more remotely located servers that are accessible over a network. This configuration of remote location of servers and their accessibility over the network can be referred as a cloud 130. In one embodiment, the component C1 may be a part of the distributed MEAP 110 itself. The distributed MEAP 110 sends the request to the selected component C1. The component C1 executes the request. In one embodiment, execution comprises forwarding the request to some other component. In one embodiment, execution comprises processing data based upon the request to generate an output. The generated output is sent to the distributed MEAP 110. In one embodiment, the output comprises a processed data or a confirmation message. The distributed MEAP 110 stores the output in a backend system 140 or sends the output to other component for further execution. In one embodiment, the distributed MEAP 110 sends the output to the portable device 120.

The portable device 120 can be any mobile computing device such as a smart phone. The portable device 120 is registered with the distributed MEAP 110. Using the portable device 120, a user can send the request to be executed by the distributed MEAP 110. The request may be for transforming data, storing data, filtering data, forwarding data, etc. In one embodiment, the request may comprise a sequence of tasks (tasks queue) to be executed in order. For example, the request may comprise tasks namely 'staging,' 'validation,' and 'distribution' which is to be executed in sequence. The 'staging' transforms data and produces clean, correct, and useful data. The 'validation' ensures that a program operates on the clean, correct, and useful data and the 'distribution' is meant for distributing or loading the validated data into data warehouses, data marts, or any data stores.

Figure 2:
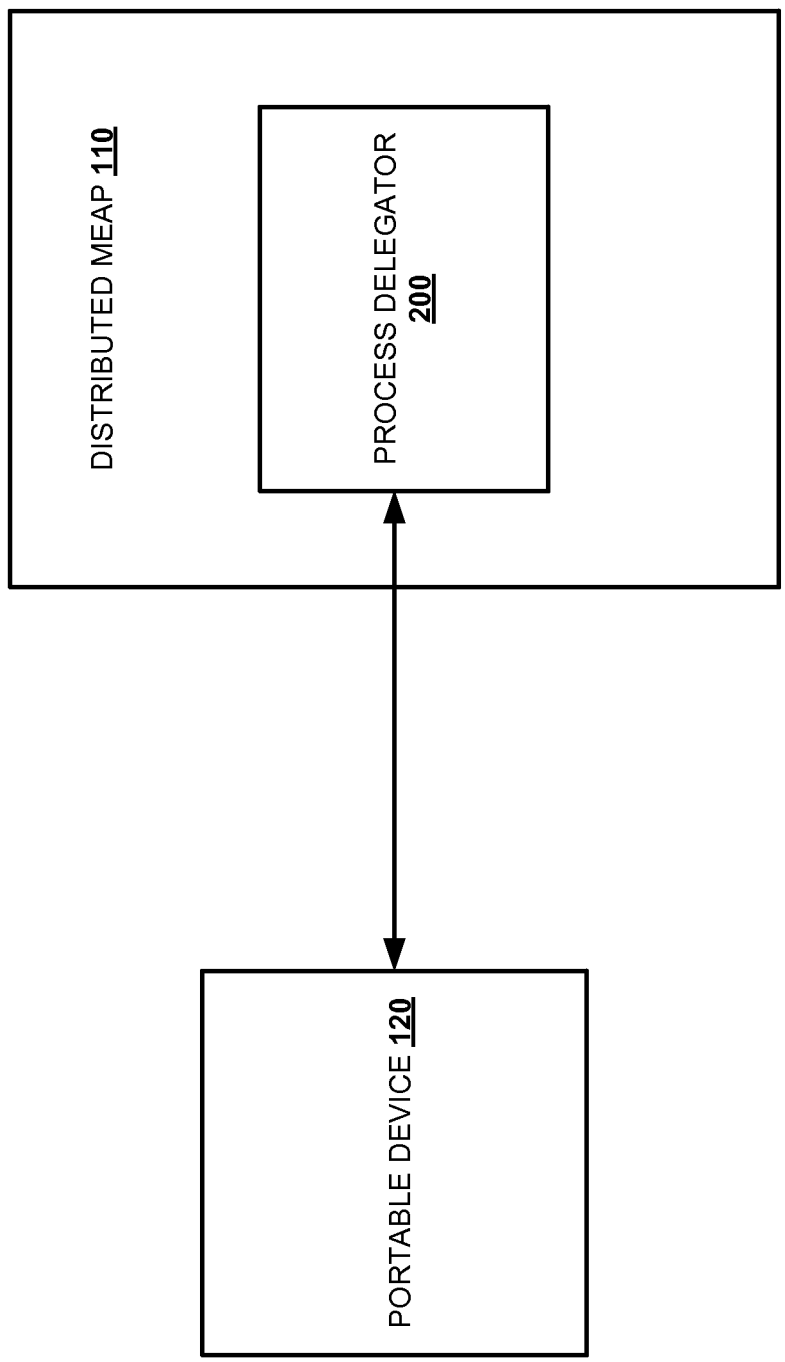
FIG. 2 is a block diagram of the distributed MEAP including a process delegator communicatively coupled to the portable device, according to an embodiment.

Referring to FIG. 2, the request is received by the distributed MEAP 110. In one embodiment, the request is received by a process delegator 200 included within the distributed MEAP 110. In one embodiment, the process delegator 200 may be external to the distributed MEAP 110. Once the request is received by the process delegator 200, the process delegator 200 determines or selects the component to execute the request. In one embodiment, the process delegator 200 is a state machine component which selects the component to execute the request. In one embodiment, the process delegator 200 selects the component based upon the request or context of the request. In one embodiment, the context implies various fields within the request format. In one embodiment, the context implies a type of the task the request performs. For example, if the request is for 'filtering data' then the process delegator 200 selects a 'filtering component.'

Figure 3:
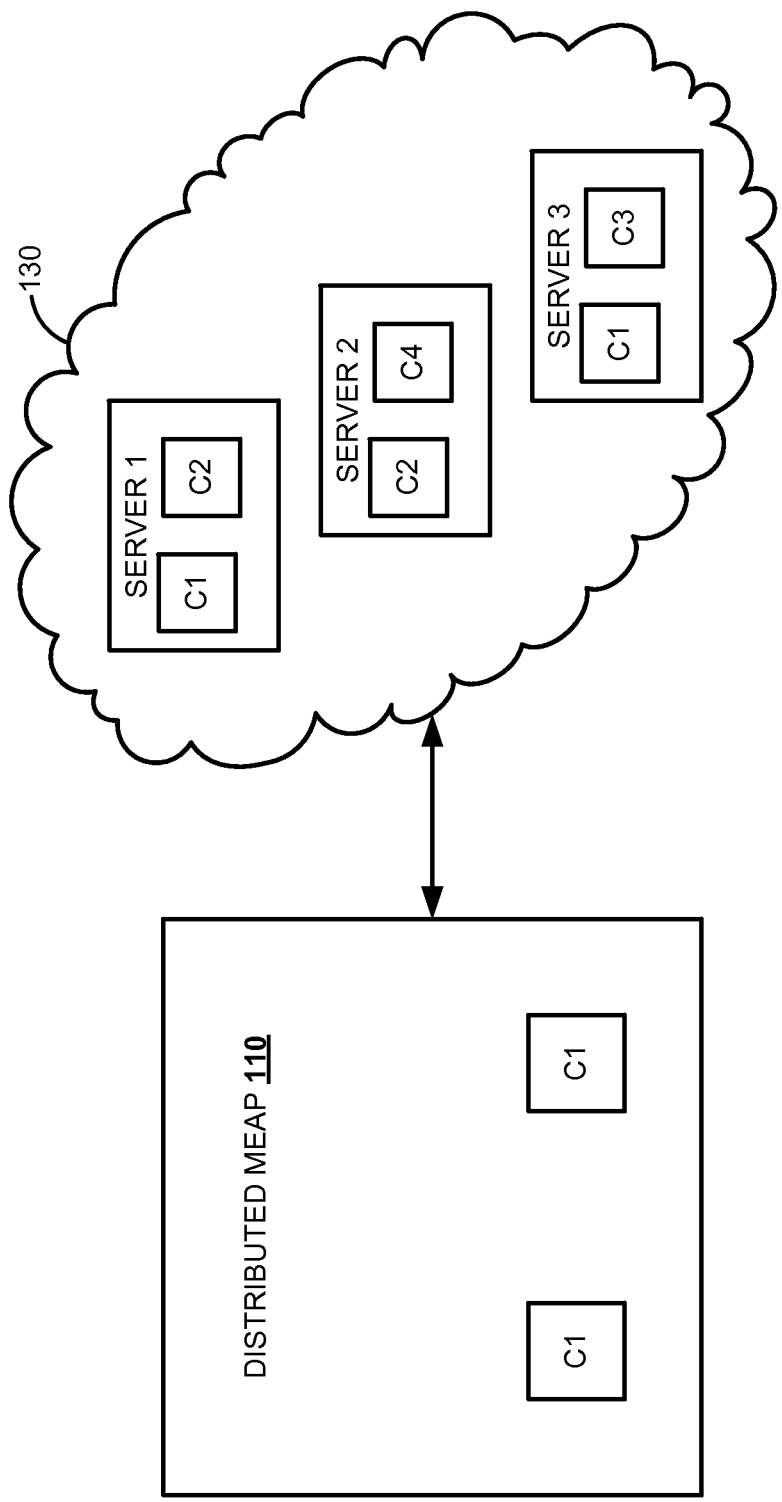
FIG. 3 illustrates middleware components on the distributed MEAP and various servers registered with the distributed MEAP, according to an embodiment.

The process delegator 200 selects the component from various available components capable of executing the request. The components may be available within the distributed MEAP 110 or on the cloud 130. For example, one or more 'filtering components' may be available within the distributed MEAP 110 or on the cloud 130. FIG. 3 illustrates various servers, e.g., server 1-server 3, on the cloud 130 which are registered with the distributed MEAP 110. The servers, e.g., server 1-server 3, are remotely located servers. The process delegator 200 looks for the available components, e.g., various filtering component C1, within the distributed MEAP 110 and on the servers 1-3. As shown, the filtering component C1 is available within distributed MEAP 110 and on the server 1 and server 3. Therefore, the process delegator 200 selects one of the filtering component C1 from various filtering components C1 available on the distributed MEAP 110, server 1, and server 3.

In one embodiment, the process delegator 200 selects the component C1 based upon the 'availability' or 'workload' of the component C1. In one embodiment, the component having the least or the lowest workload is selected. For example, if the workload of the component C1 of server 3 is less than the workload of the component C1 of server 1 and the workload of the component C1 of distributed MEAP 110 then the component C1 of the server 3 is selected. In one embodiment, the component having less than a threshold or a predefined workload is selected. In one embodiment, if a plurality of components C1 has the lowest workload, then one of the plurality of components is selected randomly to execute the request, in one embodiment, if all the available components C1 are over loaded and not available, then the distributed MEAP 110 can create the component C1 on any of the registered servers. In one embodiment, the distributed MEAP 110 selects the server which is least busy and then creates the component C1 on that server. In one embodiment, the component C1 is created by executing a predefined code of the component C1 on the selected server. Typically, an instance of the component C1 is created on the selected server.

In one embodiment, the request is executed on one or more specific servers. The process delegator 200 determines a client sending the request. Once the client is determined, the process delegator 200 sends the request to the component existing on the server registered for the client. For example, if the client has registered server 1 and server 2, then the requests from the client would be executed by the components on the distributed MEAP 110, server 1, and server 2. In one embodiment, executing requests on specific servers ensure security or confidentiality of data. In one embodiment, the distributed MEAP 110 creates the component C1 on the server registered by the client for executing request from that client.

The created or the selected component C1 executes the request. In one embodiment, executing the request implies transforming data to generate the output. In another embodiment, executing the request implies forwarding the request to some other component. In one embodiment, the component C1 sends the output or confirmation to the distributed MEAP 110. In one embodiment, the component C1 is termed 'target' as it processes (e.g., filters) data passed to it. The generated output (e.g., filtered data) is returned to the distributed MEAP 110. The distributed MEAP 110 stores the output in the data store such as the backend system 140. The backend system 140 may be any enterprise system e.g., an enterprise resource planning (ERP), a customer relationship management (CRM), a human capital management (HCM), etc.

In one embodiment, the component C1 sends a confirmation message that the request is executed to the process delegator 200. In one embodiment, the component C1 sends the output (filtered data) to other component for execution. At the instance of sending the output, the component C1 may be termed as 'sender' because it sends data to be executed by other component.

Figure 4:
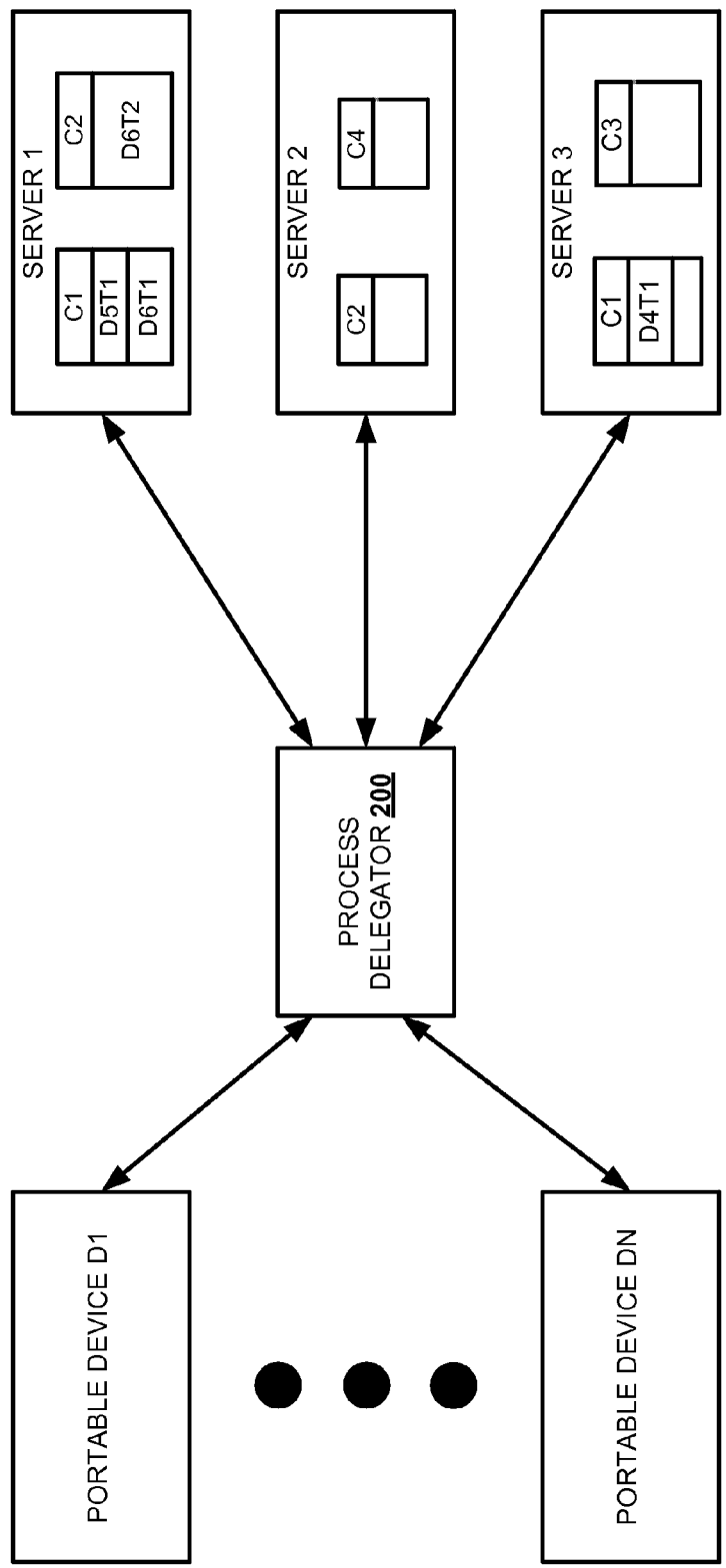
FIG. 4 is a block diagram illustrating the process delegator executing requests from various portable devices on the servers registered with the distributed MEAP, according to an embodiment.

FIG. 4 illustrates the process delegator 200 receiving requests from various portable devices D1-DN. The requests may be queue-requests which comprise tasks required to be executed in a particular sequence or order. For example, there may be a request from the device D1 to execute tasks T1-T3 in an order. The output of task T1 is provided as input to task T2. and the output of task T2 is provided as input to task T3. Therefore, D1T1→D1T2→D1T3 is to be executed. Suppose, task T1 is to be executed by the component C1, task T2 is to be executed by the component C2, and the task T3 is to be executed by the component C3.

To execute the task T1 from the device D1, the process delegator 200 determines the least busy component C1 available on cloud 130 and the distributed MEAP 110. As shown, the component C1 of server 3 is least busy (only one task T1 is running on it from device D4), therefore, the process delegator 200 sends D1T1 to the component C1 of server 3. In one embodiment, more than one component C1 might be running on server 3. The D1T1 is executed on the component C1 of server 3 to generate the output O1.

In one embodiment, while D1T1 is being executed on server 3, the process delegator 200 receives the request from the device D2 to execute tasks T1-T3 in order. At that time, suppose the component C1 of server 1 becomes free and completes executing previous two tasks T1 from the devices D5 and D6. The process delegator 200 selects the component C1 of server 1 to execute D2T1. Therefore, the process delegator 200 selects the best possible option to efficiently execute the task or request at any given time.

Figure 5:
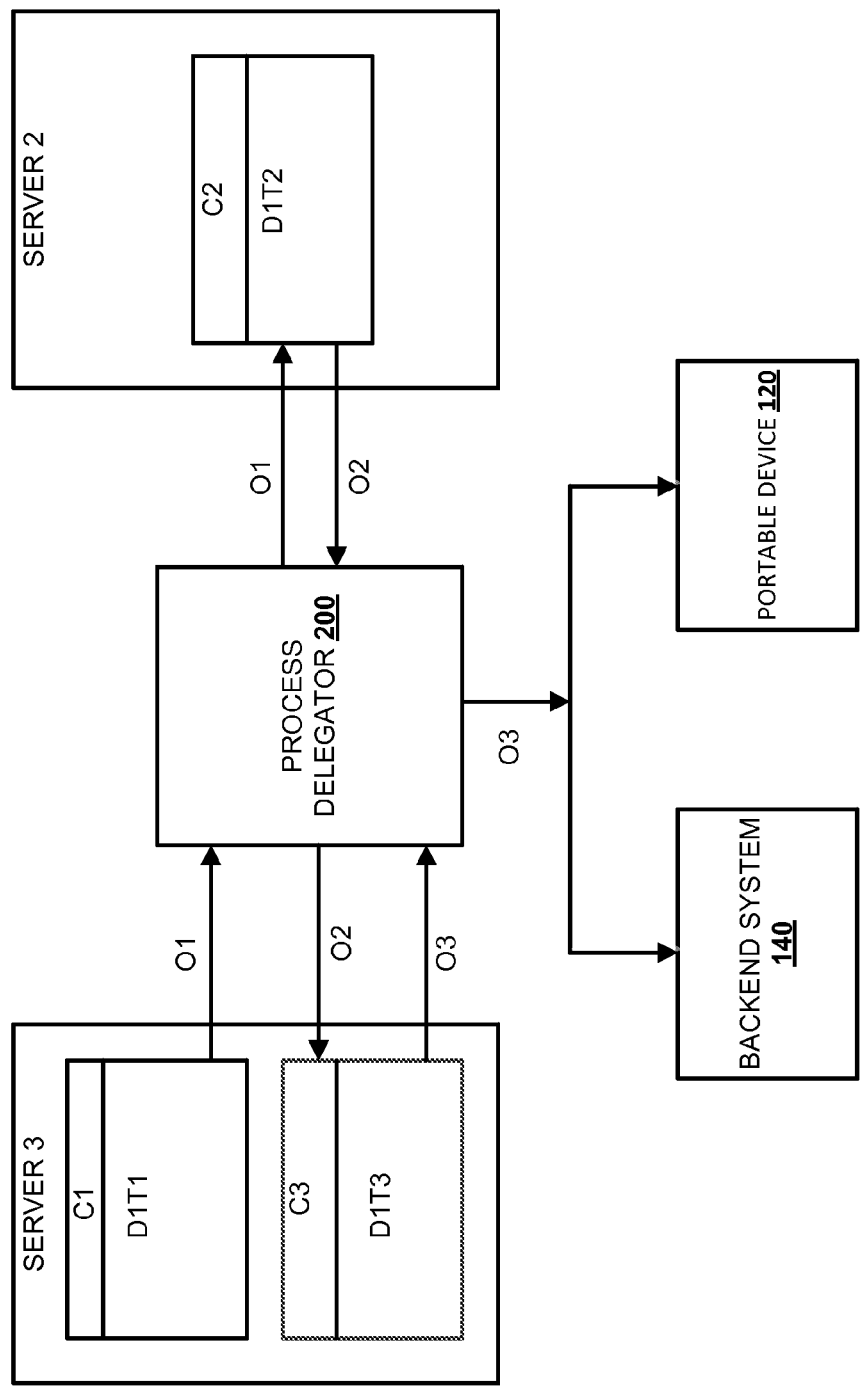
FIG. 5 is a flow diagram illustrating an execution of a request by the process delegator, according to an embodiment.

Referring to FIG. 5, the output O1 generated by the component C1 of server 3 is sent to the process delegator 200. In one embodiment, the component C1 directly sends the output O1 to the component C2 for executing the next task, i.e., D1T2. In one embodiment, the process delegator 200 selects the component C2 having least workload (e.g., component C2 on server 2 has no workload) for executing the task D1T2. The task D1T2 is executed by the component C2 of server 2 to generate the output O2. The component C2 sends the output O2 to the process delegator 200 or directly to the component C3 for executing D1T3 (last task). In one embodiment, the process delegator 200 selects the component C3 having least workload (e.g., C3 of server 3) for executing the task D1T3 to generate a final output O3. The final output O3 is received by the process delegator 200. The process delegator 200 either stores the output O3 within the backend system 140 or sends the output O3 to the portable device 120.

In one embodiment, the request comprises a mode field which indicates whether the request is to be processed in an online mode as an 'online request' or in an offline mode as an 'offline request.' The distributed MEAP 110 accordingly processes the request. The online request is the request which is processed when the portable device 120 is connected to the distributed MEAP 110, whereas the offline request is the request which may be stored and processed even if the portable device 120 is not being connected to the distributed MEAP 110. Typically, the process delegator 200 identifies the context of the request, e.g., the mode field, and then calls the target synchronously or asynchronously to execute the request. If the request is online request, the process delegator 200 calls the target synchronously to execute the request. In case of the offline request, the process delegator 200 calls the target asynchronously to execute the request. In asynchronous call, the target immediately returns the output to the process delegator 200 after executing the task.

In one embodiment, the distributed MEAP 110 pushes data or information into the portable device 120 without receiving request from the portable device 120. Typically, the distributed MEAP 110 applies 'push mechanism' to automatically update data or software of the portable device 120.

In one embodiment, the components, e.g., C1-C3, and the process delegator 200 are written in a dynamic language such as 'Erlang®.' Using a dynamic language, a latest version of code or updated component can be loaded while running an old version. Therefore, software up gradation can be easily performed while running an old version and without shutting down the operation. Once the software or the components are updated, from next execution cycle, the new or the latest version of code or updated component is used for execution.

Figure 6:
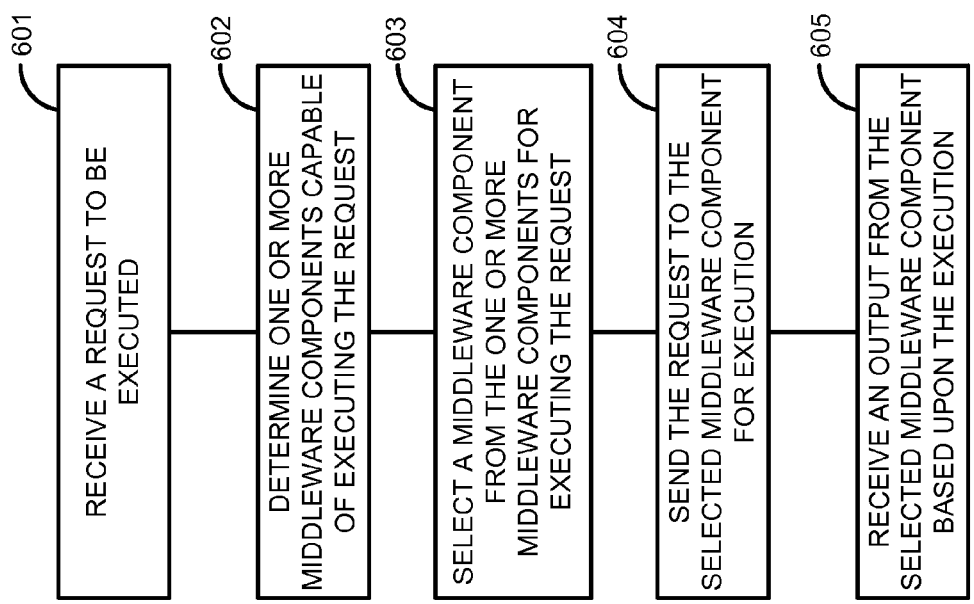
FIG. 6 is a flow chart illustrating the steps to execute a request by distributed MEAP, according to an embodiment.

FIG. 6 is a flowchart illustrating a method for executing the request by the distributed MEAP 110, according to an embodiment. The request is received by the distributed MEAP 110 at step 601. The request may be received from any portable device 120. Based upon the request, the process delegator 200, communicatively coupled to the distributed MEAP 110, determines the one or more components capable of executing the request at step 602. The one or more components are determined from the one or more servers registered with the distributed MEAP 110. The process delegator 200 selects the component, from the one or more components, for executing the request at step 603. In one embodiment, the component is selected based upon the workload of the component. One of the methods for selecting the component is described in FIG. 7. The request is sent to the selected component for execution at step 604. The selected component executes the request and generates the output. The generated output is received from the selected component at step 605. In one embodiment, the output may comprise the confirmation message or data. In one embodiment, the output is sent to the portable device 120. In another embodiment, the output is stored in the backend system 140.

Figure 7:
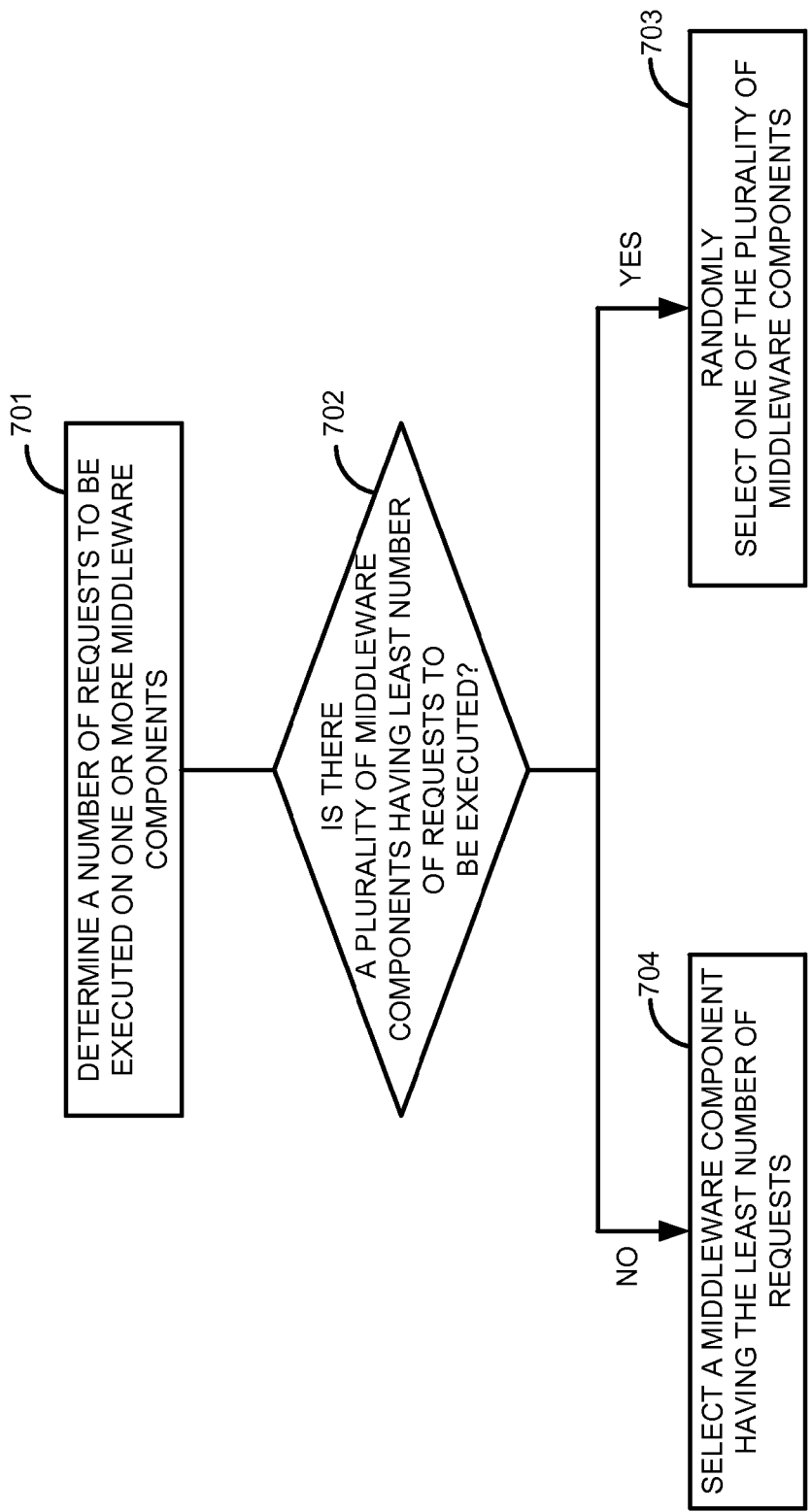
FIG. 7 is a flow chart illustrating the steps to select a middleware component for executing the request, according to an embodiment.

FIG. 7 is a flowchart illustrating a method for selecting the component for executing the request, according to an embodiment. Once the request is received by the distributed MEAP 110, the distributed MEAP 110 determines the one or more components capable of executing the request. At step 701, the distributed MEAP 110 determines the number of requests to be executed on each of the one or more components capable of executing the request. At step 702, it is determined if there are a plurality of components having the least number of requests to be executed. In case there are the plurality of components having the least number of requests to be executed (step 702: YES), the distributed MEAP 110 randomly selects one of the plurality of components for executing the request at step 703. In case a single component has least number of request (step 702: NO), the distributed MEAP 110 selects the component having the least number of request at step 704. The request is sent to the selected component for execution.

Embodiments described above provide a distributed MEAP. The distributed MEAP selects any available components from remotely located servers, apart from its own components, for executing the requests. The component is selected based upon a workload or availability of the component. Therefore, the requests can be executed very efficiently and in less time. Also, the distributed MEAP can easily scale out by registering new servers for executing requests. Further, new components can be easily created on the new servers, on demand and when required by the distributed MEAP. The process of replicating or creating components on various servers helps the distributed MEAP to scale-out and efficiently execute the request. The distributed MEAP enables execution of several requests in parallel on various servers. The distributed MEAP can also easily scale-up by using computing resources (e.g., hardware resources) from remotely located servers.

Moreover, a developer can configure whether the request is to be executed in an online mode or an offline mode, as per requirement. In one embodiment, an end user can specify the mode of executing the request as per their choice. Therefore, the distributed MEAP supports both the online and the offline mode of executing the request. Further, the distributed MEAP allows upgrading software and hardware without shutting down the operation. The code for the components, including the process delegator, is written in dynamic language such as 'Erlang®.' Therefore, a latest version of code can be easily loaded while running an old version and without shutting down the operation. Once the code is updated, from next execution, the new or the latest version of code is used for execution. Therefore, there is no wastage of operational or productive time.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
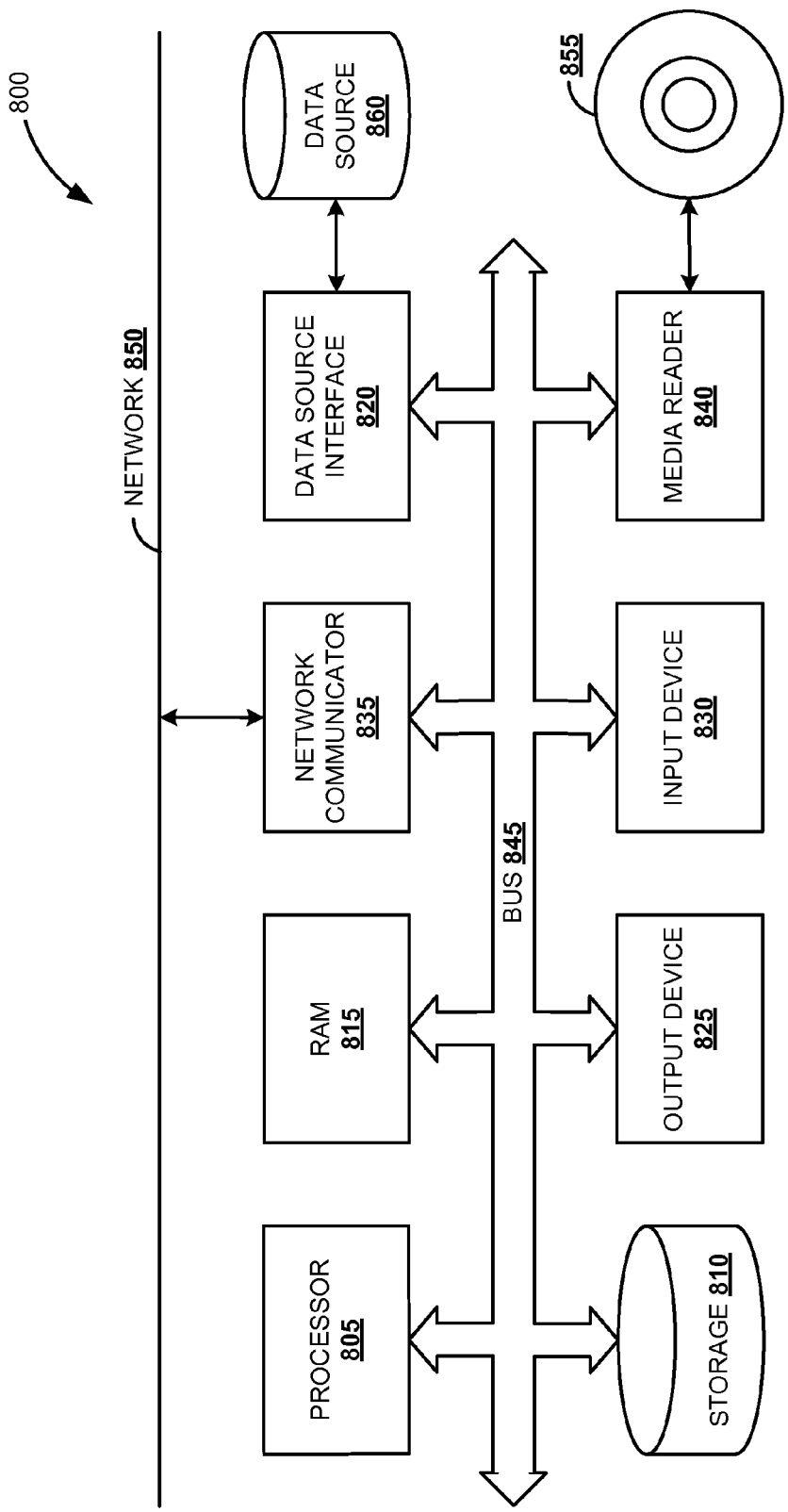
FIG. 8 is a block diagram of an exemplary computer system, according to an embodiment.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to perform operations comprising:

from a mobile device, receiving a request to be executed;

determining a context of the request by identifying one or more fields included within the request;

based upon the context of the request, determining whether one or more middleware components are capable of executing the request, wherein the one or more middleware components are determined from one or more remotely located servers;

when the one or more middleware components are capable of executing the request, selecting a middleware component from the one or more middleware components for executing the request;

when the one or more middleware components are not capable of executing the request, creating a middleware component on one of the one or more remotely located servers by triggering an execution of a predefined code of the middleware component, for executing the request;

sending the request to one of:
   the selected middleware component for execution, when the one or more middleware components are capable of executing the request; and
   the created middleware component for execution, when the middleware components is created; and based upon the execution, receiving an output from the one of:
   the selected middleware component, when the selected middleware component executed the request; and
   the created middleware component, when the created middleware component executed the request.

2. The article of manufacture of claim 1, wherein instructions to select the middleware component for executing the request further comprises:
determine a number of requests to be executed on the one or more middleware components; and
select the middleware component having a least number of requests to be executed.

3. The article of manufacture of claim 2 further comprising instructions which when executed cause the computer to:
when there are a plurality of middleware components having the least number of requests to be executed, select a middleware component from the plurality of middleware components at random.

4. The article of manufacture of claim 1, wherein the output comprises at least one of data and a confirmation message.

5. The article of manufacture of claim 1 further comprising instructions which when executed cause the computer to forward the output to at least one of:
the mobile device from which the request is received; and
another middleware component on the one or more remotely located servers.

6. The article of manufacture of claim 1, wherein the one or more remotely located servers are registered by a user.

7. The article of manufacture of claim 1 further comprising instructions which when executed cause the computer to:
determine whether the request is to be executed as an online request or an offline request;
when the request is to be executed as the online request, execute the request synchronously; and
when the request is to be executed as the offline request, execute the request asynchronously.

8. The article of manufacture of claim 1, wherein instructions to determine the one or more middleware components capable of executing the request further comprises:
identify a user sending the request;
determine the one or more remotely located servers registered for the identified user; and
from the determined one or more registered remotely located servers, determine the one or more middleware components capable of executing the request.

9. A computer-implemented method for distributed mobile enterprise application platform (MEAP), the method comprising:
from a mobile device, receiving a request to be executed;
determining a context of the request by identifying one or more fields included within the request;
based upon the context of the request, determining whether one or more middleware components are capable of executing the request, wherein the one or more middleware components are determined from one or more remotely located servers;
when the one or more middleware components are capable of executing the request, selecting a middleware component from the one or more middleware components for executing the request;
when the one or more middleware components are not capable of executing the request, creating a middleware component on one of the one or more remotely located servers by triggering an execution of a predefined code of the middleware component, for executing the request;
sending the request to one of:
   the selected middleware component for execution, when the one or more middleware components are capable of executing the request; and
   the created middleware component for execution, when the middleware components is created; and
based upon the execution, receiving an output from the one of:
   the selected middleware component, when the selected middleware component executed the request; and
   the created middleware component, when the created middleware component executed the request.

10. The method of claim 9, wherein selecting the middleware component further comprises:
determining a number of requests to be executed on the one or more middleware components; and
selecting the middleware component having a least number of requests to be executed.

11. The method of claim 10 further comprising:
determining whether there are a plurality of middleware components having the least number of requests to be executed; and
when there are the plurality of middleware components having the least number of requests to be executed, selecting the middleware component from the plurality of middleware components at random.

12. The method of claim 9 further comprises forwarding the output to at least one of:
the mobile device from which the request is received; and
another middleware component on the one or more remotely located servers.

13. The method of claim 9 further comprises:
determining whether the request is to be executed as an online request or an offline request;
when the request is to be executed as the online request, executing the request synchronously; and
when the request is to be executed as the offline request, executing the request asynchronously.

14. A system for distributed mobile enterprise application platform (MEAP), the system comprising:
one or more middleware components included in one or more remotely located servers and capable of executing a request from a mobile device; and
a process delegator within the MEAP configured to:

receive the request to be executed from the mobile device;

determine a context of the request by identifying one or more fields included within the request;

based upon the context of the request, determine whether the one or more middleware components are available for of executing the request;

when the one or more middleware components are available for executing the request, select a middleware component for executing the request;

when the one or more middleware components are not capable of executing the request, create a middleware component on one of the one or more remotely located servers by triggering an execution of a predefined code of the middleware component, for executing the request;

send the request to one of:
 the selected middleware component for execution, when the one or more middleware components are capable of executing the request; and
 the created middleware component for execution, when the middleware components is created; and based upon the execution, receive an output from the one of:
 the selected middleware component, when the selected middleware component executed the request; and
 the created middleware component, when the created middleware component executed the request.

15. The system of claim 14, wherein the process delegator is further configured to select the middleware component by:
 determining a number of requests to be executed on the one or more middleware components; and
 selecting the middleware component having a least number of requests to be executed.

16. The system of claim 15, wherein the process delegator is further configured to:
 determine whether there are a plurality of middleware components having the least number of requests to be executed; and
 when there are the plurality of middleware components having the least number of request to be executed, select the middleware component from the plurality of middleware components at random.

17. The system of claim 14, wherein the process delegator is configured to determine the one or more middleware components capable of executing the request by:
 identifying a user sending the request;
 determining the one or more remotely located servers registered for the identified user; and
 from the determined one or more registered remotely located servers, determining the one or more middleware components capable of executing the request.

\* \* \* \* \*